(12) United States Patent
Sulser et al.

(10) Patent No.: US 7,994,259 B2
(45) Date of Patent: Aug. 9, 2011

(54) POLYMER COMPRISING AMIDE AND ESTER GROUPS, METHOD FOR PRODUCTION AND USE THEREOF

(75) Inventors: Ueli Sulser, Unterengstringen (CH); Irene Schober, Zürich (CH); Ulf Velten, Oberengstringen (CH); Anna Krapf, Uitikon Waldegg (CH)

(73) Assignee: Sika Technology AG, Baar (CH)

( * ) Notice: Subject to any disclaimer, the term of this patent is extended or adjusted under 35 U.S.C. 154(b) by 895 days.

(21) Appl. No.: 10/593,541

(22) PCT Filed: Mar. 18, 2005

(86) PCT No.: PCT/EP2005/051275
§ 371 (c)(1),
(2), (4) Date: Jul. 25, 2007

(87) PCT Pub. No.: WO2005/090416
PCT Pub. Date: Sep. 29, 2005

(65) Prior Publication Data
US 2008/0021169 A1    Jan. 24, 2008

(30) Foreign Application Priority Data
Mar. 19, 2004  (EP) .................................... 04006641

(51) Int. Cl.
*C08F 8/14*   (2006.01)
*C08F 8/32*   (2006.01)
*C08F 20/06*  (2006.01)

(52) U.S. Cl. ............... 525/329.9; 525/329.7; 525/330.1; 525/378; 525/379; 525/384; 525/385

(58) Field of Classification Search ............... 525/329.7, 525/329.9, 330.1, 378, 379, 384, 385
See application file for complete search history.

(56) References Cited

U.S. PATENT DOCUMENTS

| | | | |
|---|---|---|---|
| 3,005,784 A | | 10/1961 | Jones et al. |
| 5,583,183 A | * | 12/1996 | Darwin et al. ............. 525/329.9 |
| 6,921,801 B2 | | 7/2005 | Collette et al. |

FOREIGN PATENT DOCUMENTS

| | | | |
|---|---|---|---|
| CA | 2403878 | | 10/2001 |
| DE | 10015135 | | 10/2001 |
| EP | 0889860 | | 5/2000 |
| EP | 1138697 | * | 10/2001 |
| WO | WO 97/00898 | | 1/1997 |
| WO | WO 01/74736 | | 10/2001 |
| WO | WO 03/080714 | | 10/2003 |

\* cited by examiner

*Primary Examiner* — Roberto Rabago
(74) *Attorney, Agent, or Firm* — Buchanan Ingersoll & Rooney PC

(57) ABSTRACT

The invention relates to a method for the production of a polymer (P) comprising amide and ester groups, whereby, in a first step, a homo- or co-polymer (P1) of (meth)acrylic acid is reacted with a monohydroxy compound (E) at a temperature of up to 200° C., such that, in addition to ester groups, anhydride groups are formed and, in a second step, the anhydride groups formed in the first step are reacted with a monoamine compound (A) at temperatures significantly below 100° C. The invention further relates to polymers produced by the above method, the use thereof in hydraulic-setting compositions and said hydraulic-setting compositions before and after hardening by addition of water.

39 Claims, No Drawings

POLYMER COMPRISING AMIDE AND ESTER GROUPS, METHOD FOR PRODUCTION AND USE THEREOF

TECHNICAL FIELD

The present invention relates to the group of the amides and esters of polymers of α,β-unsaturated carboxylic acids.

STATE OF THE ART

Polymers of α,β-unsaturated carboxylic acids having polyalkylene glycol side chains have already been used for some time in concrete technology as plasticizers owing to their high degree of water reduction. These polymers have a comb polymer structure. There is a series of such comb polymers which, in addition to ester and carboxylic acid groups, also have amide groups.

For the preparation of these polymers, essentially two processes are used. Either polymers are prepared from the particular carboxylic acid-, ester- and amide-functional monomers by radical polymerization or in a polymer-analogous reaction from a polycarboxyl polymer and the particular alcohols and amines.

The route via radical polymerization is the most common method, but it is complicated for specific compounds by the commercial availability of the corresponding monomers and their toxicity, and requires complicated process control.

The polymer-analogous reaction has the great advantage that it is possible to obtain very different comb polymers with very different properties in a simple and reliable manner by varying the amount, the type and the ratio of alcohol and amine from commercially available polymers of α,β-unsaturated carboxylic acids, especially from poly(meth)acrylic acids. In the polymer-analogous reaction, as a result of the use of the commercially available poly(meth)acrylic acids, the step of the radical polymerization which is critical from a safety point of view, can be omitted.

Such polymer-analogous reactions are described, for example, in EP 0 889 860, EP 0 739 320 and DE 100 15 135.

The polymer-analogous reaction is effected according to the current state of the art in an acid-catalyzed reaction of carboxyl-containing polymers with monofunctional amine- or hydroxyl-terminated derivatives at temperatures of from at least 140° C. to 200° C. These reaction conditions give rise to various restrictions which make impossible a reaction of low-boiling primary or secondary amine or lead to crosslinking in the case of compounds which, in addition to the primary or secondary amine group, also have hydroxyl functions.

Firstly, it is known to those skilled in the art that, in a polymer-analogous reaction of polymers containing carboxylic groups, the addition of compounds which have more than one primary or secondary amine group or compounds which, in addition to the primary or secondary amine group, also have hydroxyl functions inevitably leads to crosslinking of the carboxyl-containing polymers. However, such crosslinking is undesired since it leads at least to a reduction in the plasticizing action. In the extreme case, the crosslinking can also lead to the reaction melt crosslinking so greatly that it can no longer be removed from a reactor. The crosslinking cannot be suppressed even by the use of solvents.

Secondly, many primary or secondary amines have a very low boiling point and are classified as an explosion risk in risk classification, since they can lead to explosions with air in certain mixing ratios and at certain ignition temperatures. All reactions known to date in a polymer-analogous reaction are effected either at high temperatures of at least 140° C. and in some cases also using reduced pressure, or introducing or passing an air or nitrogen stream through or over the reaction mixture. These drastic conditions are required to remove the water formed in a condensation reaction and hence to enable a full reaction. However, the reaction of low-boiling primary or secondary amines in a polymer-analogous reaction is made impossible, or made more complicated and expensive, by these conditions since the high temperatures required are usually above the ignition temperatures of the amines. Moreover, the use of reduced pressure leads to the boiling points of already low-boiling primary or secondary amines being lowered and to them being withdrawn undesirably from the reaction by the reduced pressure. The use of a gas stream for the removal of the water of the reaction likewise leads to undesired discharge of the amine from the reaction vessel. The result observed is an incomplete reaction, increased contamination of the distillate water and increased pollution of offgas filter and waste air.

DESCRIPTION OF THE INVENTION

It is therefore an object of the present invention to provide a process in which the disadvantages of the prior art are overcome and low-boiling primary or secondary amines or compounds which, in addition to the primary or secondary amine group, also have hydroxyl groups can be used.

It has been found that, surprisingly, this can be achieved by a process according to claim 1. This process allows polymers having amide and ester groups, as are obtainable only incompletely or with reduced quality, if at all, with typical polymer-analogous processes, to be prepared in a reliable manner. This process allows a reaction of the low-boiling primary or secondary amines or of compounds which, in addition to the primary or secondary amine group, also have hydroxyl groups, and is extremely advantageous from ecological aspects with regard to offgases and distillation water, and also from process technology aspects. The comb polymers prepared by the present process are highly suitable as plasticizers for hydraulically setting compositions. Moreover, it has been found that, surprisingly, thanks to the process according to the invention, the possibility exists of achieving a high side chain density, and also that the comb polymers thus prepared in use in hydraulically setting compositions lead to reduced retardation of the hardening operation and to longer processing time. When the reduction in the ion density in the customary polymer-analogous process is attempted to control the properties of the polymer, for example by increasing the content of ester groups, there is steric hindrance from a certain degree of esterification which complicates the further reaction or even makes it impossible. The resulting increased thermal stress additionally increases the risk of polyether cleavage, which leads to undesired crosslinking of the polymers.

The invention encompasses the polymers prepared by this process, their use in hydraulically setting compositions and these hydraulically setting compositions before and after hardening by means of water. Further advantageous embodiments of the invention are evident from the subclaims.

Ways of Performing the Invention

The present invention relates firstly to a process for preparing a polymer P having amide and ester groups, in which in a first step, a homo- or copolymer P1 of (meth)acrylic acid is reacted with a monohydroxylic compound E at a temperature of up to 200° C. so as to form anhydride groups in addition to ester groups, and, in a second step, the anhydride groups formed in the first step are reacted with a monoamine compound A at temperatures significantly below 100° C.

"Monohydroxylic compound" is understood here and hereinafter to mean a substance which has only one free hydroxyl group.

"Monoamine compound" is understood here and hereinafter to mean ammonia as a gas or as an aqueous solution or a substance which has only one free primary or secondary amino group.

"(Meth)acrylic acid" is understood in the entire present document to mean both acrylic acid and methacrylic acid.

The homo- or copolymer P1 of (meth)acrylic acid may be present here as a free acid, as a full or partial salt, the term "salt" here and hereinafter encompassing not only the classical salts as obtained by neutralization with a base but also complexes between metal ions and the carboxylate or carboxyl groups as ligands.

The homo- or copolymer P1 of (meth)acrylic acid is advantageously a homo- or copolymer of methacrylic acid and/or acrylic acid and/or methacrylic salt and/or acrylic salt. The homo- or copolymer P1 is preferably obtained from a homopolymerization of (meth)acrylic acid or from a copolymerization of (meth)acrylic acid with at least one further monomer which is selected from the group comprising α,β-unsaturated carboxylic acids, α,β-unsaturated carboxylic esters, α,β-unsaturated carboxylates, styrene, ethylene, propylene, vinyl acetate and mixtures thereof. The further monomer is preferably selected from the group comprising methacrylic acid, acrylic acid, crotonic acid, itaconic acid, maleic acid, fumaric acid, and the salts, esters and mixtures thereof.

A preferred copolymer P1 is a copolymer of acrylic acid and methacrylic acid, and also their salts or partial salts. The salts or partial salts are obtained here typically by radical polymerization.

A preferred homopolymer P1 is polymethacrylic acid or polyacrylic acid, especially polymethacrylic acid, its salts or partial salts. The salts or partial salts are obtained here typically by radical polymerization.

P1 is preferably a homopolymer.

The homo- or copolymer P1 of (meth)acrylic acid is obtained by a radical polymerization by customary processes. It can be effected in solvent, preferably in water or in bulk. This radical polymerization is effected preferably in the presence of at least one molecular weight regulator, especially of an inorganic or organic sulfur compound, for example mercaptans, or of a phosphorus compound. The polymerization is effected advantageously under conditions such that the homo- or copolymers P1 formed is formed from 10 to 250, preferably 20 to 100, more preferably 25 to 80, monomer units. Such homo- or copolymers P1 of (meth)acrylic acid are commercially available.

The monohydroxylicic compound E is preferably a C6- to C20-alkyl alcohol or has the formula (I)

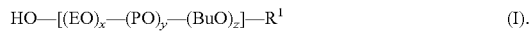

$$HO—[(EO)_x—(PO)_y—(BuO)_z]—R^1 \quad (I).$$

In this formula, the indices x, y, z are each independently from each other the values of 0-250 and their sum x+y+z is from 3 to 250. In addition, in the formula (I), EO=ethyleneoxy, PO=propyleneoxy, BuO=butyleneoxy or isobutyleneoxy. The sequence of the EO, PO, BuO units may be present in any possible sequence. Finally, the substituent $R^1$ means an alkyl group having 1-20 carbon atoms or an alkylaryl group having 7-20 carbon atoms.

Preference is given to monohydroxylic compounds E of the formula (I), especially having a methyl, ethyl, i-propyl or n-butyl group as the substituent $R^1$ and with z=0. E preferably comprises copolymers of EO/PO, more preferably polyethylene glycol capped at one end.

Mixtures of a plurality of different compounds of group E are likewise possible. For example, it is possible to mix polyethylene glycols capped at one end and having different molecular weights, or it is possible, for example, to use mixtures of polyethylene glycols capped at one end with copolymers of ethylene oxide and propylene oxide capped at one end or polypropylene glycols capped at one end. Equally possible, for example, are also mixtures of C6- to C20-alkyl alcohols and polyethylene glycols capped at one end.

In a preferred embodiment, the monohydroxylic compound E is a polyalkylene glycol which is capped at one end and has a molecular weight $M_w$ of from 300 to 10 000 g/mol, especially from 500 to 5000 g/mol, preferably from 800 to 3000 g/mol.

In a first step, the homo- or copolymer P1 is reacted with the monohydroxylic compound E at a temperature of up to 200° C. The temperature for this reaction is preferably between 140° C. and 200° C. However, the reaction is also possible at temperatures between 150° C. and 175° C. Such a high temperature is needed to obtain efficient esterification.

In a preferred embodiment, this first step is carried out in the presence of an esterification catalyst, especially of an acid. Such an acid is preferably sulfuric acid, p-toluenesulfonic acid, benzenesulfonic acid, methanesulfonic acid, phosphoric acid or phosphorous acid. Preference is given to sulfuric acid. The water can be removed from the reaction mixture under atmospheric pressure or else under reduced pressure. It is also possible for a gas stream to be conducted over or through the reaction mixture. The gas stream used may be air or oxygen.

In one embodiment, in the first step, a monoamine compound A' is used in addition to the monohydroxylic compound E. As a result, not only are ester and anhydride groups formed, but also amide groups as early as in the first step. The monoamine compound A' has a boiling point and flashpoint which are higher than the reaction temperature of the first step. Moreover, the monoamine compound A' must not contain any hydroxyl groups.

Typical examples of such monoamine compounds A' can be illustrated by the formula (II')

$$R^{2'}NH—R^{3'} \quad (II').$$

Firstly, $R^{2'}$ and $R^{3'}$ together may form a ring which optionally contains oxygen, sulfur or further nitrogen atoms.

Examples of such monoamine compounds A' are 9H-carbazole, indoline or imidazole.

Secondly, $R^{2'}$ and $R^{3'}$ may each independently from each other be an alkyl group having from 8 to 20 carbon atoms, a cycloalkyl group having from 5 to 9 carbon atoms, an aralkyl group having from 7 to 12 carbon atoms, a compound of the formula (III'), (IV') or (V') or H.

$$—R^{4'}—X(R^{5'})_v \quad (III')$$

(IV')

$$—R^{4'}—N\overset{R^{6'}}{\underset{}{\frown}}$$

$$—[(EO)_x—(PO)_y—(BuO)_z]—R^1 \quad (V')$$

$R^{4'}$ here is a C1- to C4-alkylene group. $R^{5'}$ is a $C_1$- to $C_4$-alkyl group. X=S, O or N, and v=1 when X=S or O, or v=2 when X=N. $R^{6'}$ is an alkylene group optionally having heteroatoms and forms with the nitrogen atom a 5- to 8-membered ring, in particular a 6-membered ring. The substituent $R^1$ and the indices x, y and z are each as already defined for the compound of the formula (I).

Examples of such monoamine compounds A' are dioctylamine, distearylamine, di(tallow fat)amine, fatty amines such as stearylamine, coconut fat amine, octadecylamine, tallow fat amine, oleylamine; 3-butoxypropylamine, bis(2-methoxyethyl)amine; α-methoxy-ω-amino-polyoxyethylene, α-methoxy-ω-amino-polyoxy-propylene, α-methoxy-ω-amino-oxyethylene-oxypropylene copolymer.

The monoamine compound A' is preferably a primary monoamine. Particularly preferred monoamine compounds A' are compounds of the formula (II') where $R^{2'}$ is of the formula (V') and $R^{3'}$ is H; especially preferred are α-methoxy-ω-amino-oxyethylene-oxypropylene copolymers or α-methoxy-ω-amino-polyoxyethylenes. Most preferred are α-methoxy-ω-amino-polyoxyethylenes. Such monoamine compounds A' are, for example, obtainable from an alcohol-started polymerization of ethylene oxide and/or propylene oxide, followed by conversion of the terminal alcohol group to an amine group.

The homo- or copolymer P1 is reacted with the monohydroxylic compound E typically such that the monohydroxylic compound E is added to the homo- or copolymer P1 with stirring and the mixture is heated to the reaction temperature. The mixture is stirred further at the above-described reaction temperature and reacted, possibly under reduced pressure or by passing a gas stream over or through the reaction mixture. If monoamine compound A' is used, it can be added simultaneously with the monohydroxylic compound E or else at a later time during the first reaction step.

After the reaction, which can be monitored by means of measuring the acid number, the reaction product is either processed further or stored. The storage can be effected either in heated vessels or at room temperature. In the latter case, the reaction product can be heated again before further use, for example until it melts.

In this first step, in addition to the esters between the homo- or copolymers P1 and the monohydroxylic compound E—and if appropriate in addition to the amides between the homo- or copolymer P1 and the monoamine compound A'—anhydride groups are also formed. The existence of these anhydride groups can be proved in a very simple manner by means of infrared spectroscopy, since the anhydride group is known to have a very intensive double band in the region of ~1800 cm$^{-1}$ and ~1760 cm$^{-1}$.

Preference is given to not using any amines A' in the first step.

In a second step, the product which is formed in the first step and has anhydride groups in addition to ester groups and optionally amide groups is reacted with a monoamine compound A at temperatures significantly below 100° C. This reaction is effected preferably below 60° C., especially below 40° C. The reaction is preferably effected between 10° C. and 60° C., more preferably between 15 and 40° C. This reaction can be realized under gentle conditions and requires no reduced pressure, so that it is also possible to use monoamine compounds A with a low boiling point or else monoamine compounds A which, in addition to the amino group, also contain hydroxyl groups.

The monoamine compound A preferably has the formula (II)

Firstly, $R^2$ and $R^3$ together may form a ring which optionally contains oxygen, sulfur or further nitrogen atoms.

Examples of such monoamine compounds A are in particular piperidine, morpholine, pyrrolidine, 1,3-thiazolidine, 2,3-dihydro-1,3-thiazole, imidazole. Morpholine is particularly suitable.

Secondly, $R^2$ and $R^3$ may each independently be an alkyl group having from 1 to 12 carbon atoms, a cycloalkyl group having from 5 to 9 carbon atoms, an aralkyl group having from 7 to 12 carbon atoms, a hydroxyalkyl group, a compound of the formula (III), (IV) or (V) or H.

$R^4$ is a C1- to C4-alkylene group. $R^5$ is a $C_1$- to $C_4$-alkyl group. X=S, O or N, and v=1 when X=S or O, or v=2 when X=N. $R^6$ is an alkylene group optionally having heteroatoms and, with the nitrogen atom, forms a 5- to 8-membered ring, especially a 6-membered ring. The substituent $R^1$ and the indices x, y and z are each as already defined for the compound of the formula (I).

A preferred hydroxyalkyl group is the —CH$_2$CH$_2$—OH or —CH$_2$CH(OH)CH$_3$ group.

Suitable monoamine compounds A are, for example, ammonia, butylamine, hexylamine, octylamine, decylamine, diethylamine, dibutylamine, dihexylamine, cyclopentylamine, cyclohexylamine, cycloheptylamine and cyclooctylamine, dicyclohexylamine; 2-phenylethylamine, benzylamine, xylylamine; N,N-dimethylethylenediamine, N,N-diethylethylenediamine, 3,3'-iminobis(N,N-dimethylpropylamine), N,N-dimethyl-1,3-propanediamine, N,N-diethyl-1,3-propanediamine, N,N,N'-trimethylethylenediamine, 2-methoxyethylamine, 3-methoxypropylamine; ethanolamine, isopropanolamine, 2-aminopropanol, diethanolamine, diisopropanolamine, N-isopropylethanolamine, N-ethylethanolamine, N-butylethanolamine, N-methylethanolamine, 2-(2-aminoethoxy)ethanol; 1-(2-aminoethyl)piperazine, 2-morpholinoethylamine, 3-morpholinopropylamine.

The monoamine compound A is more preferably selected from the group comprising ammonia, morpholine, 2-morpholin-4-ylethylamine, 2-morpholin-4-ylpropylamine, N,N-dimethylaminopropylamine, ethanolamine, diethanolamine, 2-(2-aminoethoxy)ethanol, dicyclohexylamine, benzylamine, 2-phenylethylamine and mixtures thereof. Ammonia can be used as a gas or in an aqueous solution. Owing to the handling and to operational advantages, ammonia is preferably used as an aqueous solution.

The monoamine compound A may also be a monoamine compound A', although this is not preferred.

For the reaction in the second step, preference is given to using a solvent. Preferred solvents are, for example, hexane, toluene, xylene, methylcyclohexane, cyclohexane or dioxane, and also alcohols, especially ethanol or isopropanol, and water, water being the most preferred solvent.

In a preferred embodiment, the second step is effected by initially charging the amine in a solvent, preferably water, and adding the product from the first reaction step thereto with stirring as a polymer melt or else in solid form, for instance as a powder or in the form of flakes, or of a granule. Preference is given to addition as a polymer melt. In a further preferred embodiment, the second step is effected by adding the mixture or solution of amine and solvent, preferably water, to the polymer melt cooled to below 100° C. This second reaction step can follow the first reaction step directly, in which the product is already present as a melt, or else at a later time.

When solvent is utilized in the second stage, the solvent can, if desired, be removed again, for example by applying reduced pressure and/or heating, or it can be diluted even further.

In the second step, in addition to amide formation, amine salts can also form. In order to reduce this amine salt formulation and increase the yield of the amidation, alkali metal hydroxides or alkaline earth metal hydroxides can preferably be added to the monoamine compound A.

The process according to the invention enables polymers P having amide and ester groups to be obtained, which can be obtained by the typical polymer-analogous process only in poor quality, if at all, since the amines required for the amide groups are too highly volatile or have too low a flashpoint or, in addition to the amine group, also have hydroxyl groups. Moreover, this process enables the content of carboxylic acid groups, and hence the ion density in the polymer backbone, to be reduced in a very simple manner without increased thermal stress and hence without risk of polyether cleavage which would lead to undesired crosslinking of the polymers. When attempts are made to reduce the ion density in customary polymer-analogous processes, for example by increasing the ester groups, there is steric hindrance from a certain degree of esterification, which complicates the further reaction or even makes it impossible. Depending on the amount and type of the monoamine compound A, different properties of the end product can be achieved. It is therefore a further advantage of the process according to the invention that, starting from an intermediate, i.e. the reaction product of the first step, it is possible in a simple and cost-efficient manner by using different monoamine compounds or different amounts of the monoamine compound A to prepare several different polymers P having amide and ester groups. This has great logistical and financial advantages.

In a preferred embodiment, the polymer P having amide and ester groups essentially has the structure of the formula (VI)

The substituents $R^2$ and $R^3$ have already been described for the monoamine compound A of the formula (II). The substituents $R^{2'}$ and $R^{3'}$ have already been described for the monoamine compound A' of the formula (II'). The substituents $R^1$, EO, PO, BuO and the indices x, y and z have already been described for the monohydroxylic compound E of the formula (I).

The indices n, m, m' and p are each integers, where the sum of n+m+m'+p=10-250, preferably 20-100, in particular 25-80, and n>0, m>0 and p>0 and m'≧0.

The sequence of the three units a, b1, b2 and c may be blockwise or random, with the exception that, as a result of the anhydride mechanism of amide formation, the unit b2 must be adjacent to or close to, especially adjacent to, a.

The ratio of a:b1:b2:c here is (0.1-0.9):(0-0.06):(0.001-0.4):(0.099-0.899), with the following boundary conditions: that the sum of a+b1+b2+c forms the value 1 and that the ratio of b2/a is >0 and ≦1.

In a preferred embodiment, a polymethacrylic acid is esterified with a polyethylene glycol which is concluded at one end with a methoxy group, and then reacted gently with mono- or diethanolamine.

The polymer P having amide and ester groups finds use in various fields, especially in concrete and cement technology. In particular, the polymer P having amide and ester groups can be used as a plasticizer for hydraulically setting compositions, especially concrete and mortar. In this case, the polymer P having amide and ester groups can be admixed to a dry mixture comprising at least one hydraulically setting substance. The hydraulically setting substance may in principle be any substances known to the person skilled in the art of concrete. In particular, they are cements, for example portland cements or alumina melt cements and their respective mixtures with fly ash, fumed silica, slag, slag sands and limestone filler. Further hydraulically setting substances are gypsum, in the form of anhydrite or hemihydrate or fired lime. A preferred hydraulically setting substance is cement. In addition, additives such as sand, gravel, stones, quartz flour, chalks and constituents customary as additives, such as other concrete plasticizers, for example lignosulfonates, sulfonated naphthalene-formaldehyde condensates, sulfonated melamine-formaldehyde condensates or polycarboxylate (VI)

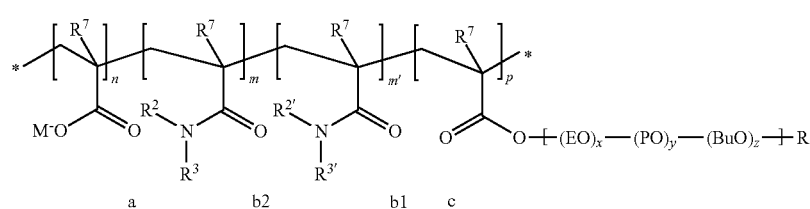

M here is a cation, in particular $H^+$, $Na^+$, $Ca^{++}/2$, $Mg^{++}/2$, $NH_4^+$ or an organic ammonium. It is clear to the person skilled in the art that, in the case of the polyvalent ions, a further counterion has to be present which may, inter alia, also be a carboxylate of the same molecule or another molecule of the polymer P. The organic ammonium compounds are in particular tetraalkylammonium or else $HR_3N^+$ where R is an alkyl group, especially a C1 to C6-alkyl group, preferably ethyl or butyl. Organic ammonium ions are obtained in particular by neutralizing the carboxyl group with commercial tertiary amines.

The substituents $R^7$ are each independently an H or methyl. Methyl is preferred as the substituent $R^7$.

ethers, accelerants, corrosion inhibitors, retardants, shrinkage reducers, defoamers, pore formers are possible.

If the polymer P having amide and ester groups is present in anhydrous form, the polymer P having amide and ester groups may be a constituent of a hydraulically setting composition, known as a dry mix, which is storable over a prolonged period and is typically packaged in sacks or stored in silos and used.

The polymer P having amide and ester groups can also be added to a customary hydraulically setting composition with or just before or just after the addition of the water. It has been found to be particularly suitable to add the polymer P having amide and ester groups in the form of an aqueous solution or dispersion, especially as mixing water or as part of the mixing water.

The polymer P having amide and ester groups is useful as a plasticizer for hydraulically setting compositions, especially cementious compositions, i.e. the resulting mixture at the water/cement (W/C) ratios customary in cement and concrete technology has a significantly greater flow performance in comparison to a composition without the plasticizer. The flow performance is typically measured via the extent of spreading. On the other hand, mixtures can be achieved which, with the same flow performance, require significantly less water, so that the mechanical properties of the cured hydraulically setting composition are greatly increased. The polymer P having amide and ester groups can also be used as a dispersant.

EXAMPLES

Example Series 1

1st Step: Esterification/Amidation and Anhydride Formation

A reaction vessel with stirrer, thermometer, vacuum connection and distillation unit is initially charged with 960 g of a 40% aqueous solution of a polymethacrylic acid having a mean molecular weight of 5000 g/mol. With stirring, 10 g of 50% sulfuric acid and 16 g of a copolymer of ethylene oxide and propylene oxide in EO/PO ratio of 70:30 and having a molecular weight $M_w$ of 2000 g/mol, which has a methoxy group at one end and a primary amino group at the other end, are added. 1200 g of a polyethylene glycol capped with a methoxy group at one end and having a mean molecular weight of 1100 g/mol are added as a melt and the reaction mixture is heated to 160° C. slowly with stirring. In the course of this, water is distilled off continuously. As soon as the reaction mixture has reached 160° C., the mixture is stirred at this temperature for 30 min and water continues to be distilled off. 16 g of 50% NaOH are then added and the temperature is increased to 165° C. Esterification is effected under reduced pressure (80 mbar) for 3 hours. The direct acid number was determined to be 1.04 mmol of COOH/g of polymer. The molten polymer is transferred and stored in an oven at 60° C. Designation: BP1.

Some of the polymer is dissolved in water to prepare a 40% solution which is designated as comparative polymer solution CP1-0.

2nd Step: Mild Amidation 60 g of an aqueous ammonia solution at approx. 20-25° C. having the concentration specified in Table 1 are initially charged in a beaker, and 40 g of the polymer melt BP1 at a temperature of approx. 60° C. are added with stirring. The mixture is stirred, dissolved and amidated for 2 hours.

TABLE 1

| Inventive examples based on reaction product BP1 of the first step. | | |
|---|---|---|
| Ammonia solution | | |
| Water [g] | Ammonia (25% strength) [g] | Reaction product |
| 58 | 2 | BP1-2A |
| 56 | 4 | BP1-4A |

TABLE 1-continued

| Inventive examples based on reaction product BP1 of the first step. | | |
|---|---|---|
| Ammonia solution | | |
| Water [g] | Ammonia (25% strength) [g] | Reaction product |
| 54 | 6 | BP1-6A |
| 52 | 8 | BP1-8A |
| 50 | 10 | BP1-10A |
| 48 | 12 | BP1-12A |

Example Series 2

1st Step: Esterification and Anhydride Formation

A reaction vessel with stirrer, thermometer, vacuum connection and distillation unit is initially charged with 480 g of a 40% aqueous solution of polymethacrylic acid having a mean molecular weight of 5000 g/mol. 5 g of 50% sulfuric acid are added with stirring. 300 g of a polyethylene glycol capped at one end with a methoxy group and having a mean molecular weight of 1100 g/mol and 600 g of a polyethylene glycol capped at one end with a methoxy group and having a mean molecular weight of 3000 g/mol are added as a melt and the reaction mixture is heated to 170° C. slowly with stirring. In the course of this, water is distilled off continuously. As soon as the reaction mixture has reached 170° C., it is stirred at this temperature for 30 min. Subsequently, esterification is effected further under reduced pressure (80-100 mbar) for 3.5 hours. The direct acid number at the end of the reaction time is determined to be 0.67 mmol of COOH/g of polymer. The molten polymer is transferred and stored at 60° C. Designation: BP2.

Some of the polymer is dissolved in water to prepare a 40% solution which is designated as comparative polymer solution CP2-0.

2nd Step: Mild Amidation a) Reaction with Ethanolamine

Ethanolamine is mixed with 50 g of water at approx. 20° C. Subsequently, the appropriate amount of the polymer melt BP2 is mixed in and dissolved with stirring. The solution is stirred at room temperature for 24 hours and diluted to a solid content of 40%.

TABLE 2

| Inventive examples based on reaction product BP2 of the first step and ethanolamine | | | |
|---|---|---|---|
| BP2 (melt) [g] | $H_2O$ [g] | Ethanolamine [g] | Reaction Product |
| 51 | 50 | 0.185 | BP2-2EA |
| 51.7 | 50 | 0.47 | BP2-5EA |
| 51.5 | 50 | 0.936 | BP2-10EA |
| 51.35 | 50 | 1.373 | BP2-15EA |
| 50.18 | 50 | 1.825 | BP2-20EA | b) Reaction with Dicyclohexylamine

Dicyclohexylamine is mixed with 50 g of water at approx. 40° C. Subsequently, the appropriate amount of the polymer melt BP2 is mixed in and dissolved with stirring. The solution is stirred at room temperature for 24 hours and diluted to a solid content of 40%.

TABLE 3

Inventive examples based on reaction product
BP2 of the first step and dicyclohexylamine

| BP2 (melt) [g] | H$_2$O [g] | Dicyclohexylamine [g] | Reaction Product |
|---|---|---|---|
| 50.62 | 50 | 0.184 | BP2-2DCHA |
| 52.87 | 50 | 0.961 | BP2-10DCHA | c) Reaction with 2-phenylethylamine

2-Phenylethylamine is mixed with 50 g of water at approx. 40° C. Subsequently, this mixture is mixed into the appropriate amount of the polymer melt BP2 which has a temperature of 80° C. with stirring. The mixture is stirred for 5 hours and a clear solution is obtained. The solution is diluted to a solid content of 40%.

TABLE 4

Inventive example based on reaction product
BP2 of the first step and 2-phenylethylamine

| BP2 (melt) [g] | H$_2$O [g] | Phenylethylamine [g] | Reaction Product |
|---|---|---|---|
| 51.48 | 50 | 0.918 | BP2-10PEA |

Example Series 3

1st Step: Esterification and Anhydride Formation

A reaction vessel with stirrer, thermometer, vacuum connection and distillation unit is initially charged with 383 g of a 50% aqueous solution of a polyacrylic acid having a mean molecular weight of 4000 and a pH of 3.4. 17 g of 50% sulfuric acid are added with stirring. 600 g of a polyethylene glycol capped at one end with a methoxy group and having a mean molecular weight of 1000 g/mol are added as a melt and the reaction mixture is heated to 170° C. slowly with stirring. In the course of this, water is distilled off continuously. As soon as the reaction mixture has reached 170° C., it is stirred at this temperature for 30 min. Subsequently, esterification is effected further under reduced pressure (100-200 mbar) at 175° C. for 3 hours. The direct acid number at the end of the reaction time was determined to be 1.9 mmol of COOH/g of polymer. The molten polymer is transferred and stored at 60° C. Designation: BP3.

Some of the polymer is dissolved in water to prepare a 40% solution which is designated as comparative polymer solution CP3-0.

2nd Step: Mild Amidation

Ethanolamine in an amount according to Table 5 is mixed with 50 g of water at approx. 20° C. Subsequently, the appropriate amount of polymer melt BP3 is mixed in and dissolved with stirring. The solution is stirred at 40° C. for 2 hours.

TABLE 5

Inventive examples based on reaction product
BP3 of the first step and ethanolamine

| BP3 (melt) [g] | H$_2$O [g] | Ethanolamine [g] | Reaction Product |
|---|---|---|---|
| 51 | 50 | 0.31 | BP3-2EA |
| 50 | 50 | 0.76 | BP3-5EA |

TABLE 5-continued

Inventive examples based on reaction product
BP3 of the first step and ethanolamine

| BP3 (melt) [g] | H$_2$O [g] | Ethanolamine [g] | Reaction Product |
|---|---|---|---|
| 54 | 50 | 1.64 | BP3-10EA |
| 52 | 50 | 2.38 | BP3-15EA |
| 53 | 50 | 3.21 | BP3-20EA |

Comparative Example in which the Ethanolamine is Added in the First Reaction Step The reaction is performed analogously to the 1$^{st}$ step from example series 2, except that 37 g of ethanolamine are added simultaneously with the addition of the polyethylene glycols capped at one end. During the heating and removal of water by distillation, the reaction mixture becomes inhomogeneous and viscous; the mixture gels at 120° C. The reaction is stopped. A homogeneous solution of the polymer cannot be prepared.

Comparative Examples

Salt Formation

The polymer melt is dissolved in 70 g of water and left to stand at 60° C. for 2 days. Subsequently, an amount of the particular amine according to Table 5 is added.

TABLE 6

Comparative examples based on reaction
product BP2 or BP3 of the first step.

| Polymer | Amount of polymer [g] | H$_2$O [g] | Amine | Amount of amine [g] | Reaction product |
|---|---|---|---|---|---|
| BP2 | 30 | 70 | Ethanolamine | 0.546 | CP2-EA salt |
| BP2 | 22 | 50 | Dicyclohexylamine | 0.40 | CP2-DCH salt |
| BP2 | 22 | 50 | 2-Phenylethylamine | 0.40 | CP2-PEA salt |
| BP3 | 50 | 70 | Ethanolamine | 1.53 | CP3-EA salt |

Exemplary Hydraulically Setting Compositions

The effectiveness of the inventive polymers was tested in mortar.

TABLE 7

Composition of the mortar mixtures utilized.

| | Amount |
|---|---|
| Mortar mixture 1: MM1 (max. grain size 8 mm) | |
| Cement (Schweizer CEM I 42.5) | 750 g |
| Limestone filler | 141 g |
| 0-1 mm sand | 738 g |
| 1-4 mm sand | 1107 g |
| 4-8 mm sand | 1154 g |
| Mortar mixture 1: MM2 (max. grain size 3 mm) | |
| Cement (Schweizer CEM I 42.5) | 880 g |
| Limestone filler | 320 g |
| 0.08-0.2 mm quartz sand | 180 g |
| 0.1-0.5 mm quartz sand | 280 g |

TABLE 7-continued

Composition of the mortar mixtures utilized.

| | Amount |
|---|---|
| 0.3-0.9 mm quartz sand | 370 g |
| 0.7-1.2 mm quartz sand | 440 g |
| 1.5-2.2 mm quartz sand | 630 g |
| 2.0-3.2 mm quartz sand | 800 g |

The sands, the filler and the cement were dry-mixed in a Hobart mixer for 1 minute. Within 30 seconds, the mixing water in which the polymer is dissolved is added and mixing is continued for a further 2.5 minutes. The total mixing time of the wet mixture is 3 minutes.

All polymer solutions were provided with the same amount of a defoamer before the mortar test.

Test Methods and Results

Direct Acid Number

Approx. 1 g of the polymer melt is dissolved in approx. 30 ml of deionized water and admixed with 3 drops of a phenolphthalein solution (1% in ethanol). 0.1N NaOH is used to titrate up to the color change.

Acid number in mmol of COOH/g=V/(10×m)

V=consumption of 0.1N NaOH in ml and m=weight of the polymer melt in g.

Flow Table Spread

The flow table spread of the mortar was determined to EN 1015-3.

Air Content

The air content of the mortar was determined according to EN 196-1.

End of Setting

The setting time was determined by means of the temperature evolution in a mortar-filled Styropor vessel of capacity approx. 1 l. The end of setting was defined as the time at which the temperature curve has the maximum value.

Pressure Resistance

The pressure resistance of the hardened mortar prisms was determined to EN 196-1.

Results

Table 8 clearly shows the advantage of the inventive polymers over the comparative example. While the processability of the mortar comprising the polymer of the comparative example worsens significantly with time (the flow table spread decreases), that of the mortars comprising the inventive polymers barely decreases within 90 minutes; on the contrary, it even increases with time for some. This can be seen clearly by the low, in some cases even negative value for $\Delta_{0-90}$.

Table 9 and 10 likewise show the excellent maintenance of processability over 90 minutes of mortars comprising the inventive polymers, while mortars comprising the comparative polymers lose a significant degree of processability. The 24-hour pressure resistance of mortar prisms which comprise the inventive polymers is the same as that of the mortar prisms comprising the comparative polymers even though the dosage of the comparative polymers is lower. This means that the inventive polymers delay the setting of the mortars to a lesser extent than the comparative polymers.

These examples show clearly that the inventive polymers have the long processability of mortar or concrete mixtures required in many applications without having the disadvantage of reduced 24-hour strength often found in such polymers.

Moreover, these mortar results show that amidation takes place in the reaction in the second reaction stage. The properties of the inventive polymers differ with regard to the maintenance of processability of the mortar mixtures significantly from those of the starting polymers and the amine salts.

TABLE 8

Results of example series 1 of mortar mixtures MM1.

| | Designation | Dosage [% solids in cement] | W/C | Flow table spread [mm] after | | | | $\Delta_{0-90}$ ‡ | Air content [%] |
|---|---|---|---|---|---|---|---|---|---|
| | | | | 0 min | 30 min | 60 min | 90 min | | |
| Inventive | BP1-8A | 0.300 | 0.42 | 162 | 183 | 161 | 161 | 1 | 4.0 |
| Inventive | BP1-8A | 0.360 | 0.42 | 192 | 189 | 187 | 174 | 18 | 3.6 |
| Inventive | BP1-10A | 0.360 | 0.42 | 176 | 176 | 172 | 175 | 1 | 3.9 |
| Inventive | BP1-12A | 0.360 | 0.42 | 157 | 170 | 173 | 175 | −18 | 3.1 |
| Comparative | CP1-0 | 0.225 | 0.42 | 210 | 186 | 176 | 156 | 54 | 2.8 |

‡ Difference in flow table spread at 0 min and 90 min

TABLE 9

Results of example series 2 of mortar mixtures MM1.

| | Designation | Dosage [% solids in cement] | W/C | Flow table spread [mm] after | | | | $\Delta_{0-90}$ ‡ | Air content [%] | 24 h pressure resistance [N/mm$^2$] |
|---|---|---|---|---|---|---|---|---|---|---|
| | | | | 0 min | 30 min | 60 min | 90 min | | | |
| Inventive | BP2-10EA | 0.300 | 0.43 | 201 | 193 | 180 | 168 | 33 | 1.8 | 24.4 |
| Inventive | BP2-10EA | 0.360 | 0.43 | 226 | 219 | 212 | 210 | 16 | 2.2 | 25.2 |
| Inventive | BP2-15EA | 0.360 | 0.43 | 202 | 203 | 210 | 201 | 1 | 3.1 | 26.3 |
| Inventive | BP2-20EA | 0.360 | 0.43 | 173 | 180 | 184 | 189 | −16 | 2.8 | 25.3 |
| Comparative | CP2-0 | 0.225 | 0.43 | 195 | 161 | 149 | 142 | 53 | 3.0 | 24.3 |
| Comparative | CP2-0 | 0.300 | 0.42 | 241 | 215 | 189 | 157 | 84 | 1.9 | 24.9 |
| Comparative | CP2-EA salt | 0.252 | 0.43 | 251 | 211 | 184 | 163 | 88 | 2.0 | 24.4 |

TABLE 9-continued

Results of example series 2 of mortar mixtures MM1.

|  | Designation | Dosage [% solids in cement] | W/C | Flow table spread [mm] after | | | | $\Delta_{0-90}$ ‡ | Air content [%] | 24 h pressure resistance [N/mm$^2$] |
|---|---|---|---|---|---|---|---|---|---|---|
|  |  |  |  | 0 min | 30 min | 60 min | 90 min |  |  |  |
| Inventive | BP2-10DCHA | 0.300 | 0.42 | 241 | 203 | 200 | 177 | 64 | 3 | 21.3 |
| Inventive | BP2-10DCHA | 0.360 | 0.42 | 256 | 224 | 216 | 214 | 42 | 1.2 | 19.5 |
| Inventive | BP2-10PEA | 0.300 | 0.42 | 240 | 218 | 203 | 202 | 38 | 2.2 | 19.9 |
| Comparative | CP2-0 | 0.225 | 0.42 | 200 | 155 | 138 | 135 | 65 | 2.4 | 20.7 |
| Comparative | CP2-DCHA salt | 0.252 | 0.42 | 237 | 182 | 162 | 145 | 92 | 3.2 | 21.9 |
| Comparative | CP2-PEA salt | 0.252 | 0.42 | 224 | 180 | 169 | 147 | 77 | 2.2 | 20.4 |

‡ Difference in flow table spread at 0 min and 90 min

TABLE 10

Results of example series 3 of mortar mixtures MM1.

|  | Designation | Dosage [% solids in cement] | W/C | Flow table spread [mm] after | | | | $\Delta_{0-90}$ ‡ | Air content [%] | 24 h pressure resistance [N/mm$^2$] |
|---|---|---|---|---|---|---|---|---|---|---|
|  |  |  |  | 0 min | 30 min | 60 min | 90 min |  |  |  |
| Inventive | BP3-5EA | 0.300 | 0.42 | 225 | 215 | 201 | 165 | 60 | 1.4 | 30.3 |
| Inventive | BP3-10EA | 0.360 | 0.42 | 223 | 218 | 209 | 185 | 38 | 1.8 | 28.3 |
| Inventive | BP3-15EA | 0.360 | 0.42 | 231 | 215 | 210 | 196 | 35 | 1.7 | 27.4 |
| Inventive | BP3-20EA | 0.360 | 0.42 | 226 | 210 | 208 | 193 | 33 | 1.6 | 30.2 |
| Comparative | CP3-0 | 0.225 | 0.42 | 205 | 195 | 150 | 132 | 73 | 1.8 | 30.0 |
| Comparative | CP3-0 | 0.300 | 0.42 | 221 | 201 | 163 | 136 | 85 | 1.9 | 27.1 |
| Comparative | CP3-EA salt | 0.252 | 0.42 | 237 | 201 | 155 | 130 | 107 | 2.0 | 26.4 |

‡ Difference in flow table spread at 0 min and 90 min

TABLE 11

Results of the mortar mixture MM2 comprising the polymer P having ester and amide groups and comparative experiment.

|  | Designation | Dosage [% solids in cement] | W/C | Flow table spread [mm] after | | | $\Delta_{0-60}$‡ | Air content [%] | End of setting [h] |
|---|---|---|---|---|---|---|---|---|---|
|  |  |  |  | 0 min | 30 min | 60 min |  |  |  |
| Inventive | BP1-2A | 0.30 | 0.44 | 232 | 229 | 223 | 9 | 5.8 | 16.8 |
| Inventive | BP1-4A | 0.30 | 0.44 | 220 | 212 | 205 | 15 | 5.4 | 16.0 |
| Inventive | BP1-6A | 0.30 | 0.44 | 211 | 209 | 201 | 10 | 5.8 | 15.5 |
| Inventive | BP1-8A | 0.30 | 0.44 | 184 | 184 | 186 | −2 | 5.6 | 14.5 |
| Inventive | BP1-10A | 0.30 | 0.44 | 169 | 174 | 175 | −6 | 4.8 | 14.0 |
| Inventive | BP1-12A | 0.30 | 0.44 | 165 | 181 | 177 | −12 | 5.6 | 13.5 |
| Comparative | CP1-0 | 0.30 | 0.44 | 224 | 220 | 219 | 5 | 6.5 | 16.8 |

‡Difference in flow table spread at 0 min and 60 min

The invention claimed is:

1. A process for preparing a polymer P having amide and ester groups, wherein,
in a first step, a homo- or copolymer P1 of (meth)acrylic acid is reacted with a monohydroxylic compound E at a temperature of up to 200° C. so as to form anhydride groups in addition to ester groups,
and, in a second step, the anhydride groups formed in the first step are reacted with a monoamine compound A at temperatures below 100° C. to give the amide.

2. The process as claimed in claim 1, wherein the first step is effected in the presence of an acid.

3. The process as claimed in claim 1, wherein the monohydroxylic compound E is a C6- to C20-alkyl alcohol or has the formula (I)

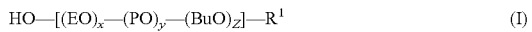

where x, y and z each independently have the values of 0-250 and x+y+z=3-250;
EO=ethyleneoxy, PO=propyleneoxy, BuO=butyleneoxy or isobutyleneoxy, with a sequence of the EO, PO, BuO units in any possible sequence;
and R$^1$=alkyl group having 1-20 carbon atoms or alkylaryl group having 7-20 carbon atoms.

4. The process as claimed in claim 3, wherein z=0 and R$^1$=methyl, ethyl, i-propyl or n-butyl group.

5. The process as claimed in claim 3, wherein the monohydroxylic compound E is a polyalkylene glycol which is capped at one end and has a molecular weight $M_w$ of from 300 to 10 000 g/mol.

6. The process as claimed in claim 1, wherein the homo- or copolymer P1 of (meth)acrylic acid is prepared by homopolymerization of (meth)acrylic acid or by copolymerization of (meth)acrylic acid with at least one further monomer selected from the group consisting of $\alpha,\beta$-unsaturated carboxylic acids, $\alpha,\beta$-unsaturated carboxylic esters, $\alpha,\beta$-unsaturated carboxylates, styrene, ethylene, propylene, vinyl acetate and mixtures thereof.

7. The process as claimed in claim 6, wherein the further monomer is selected from the group consisting of methacrylic acid, acrylic acid, crotonic acid, itaconic acid, maleic acid, fumaric acid, and the salts, esters and mixtures thereof.

8. The process as claimed in claim 1, wherein the copolymer P1 is a copolymer of acrylic acid and methacrylic acid and salts or partial salts thereof; or the homopolymer P1 is a polymethacrylic acid or polyacrylic acid, the salts or partial salts thereof.

9. The process as claimed in claim 1, wherein the homo- or copolymer P1 of (meth)acrylic acid is prepared by a radical polymerization in the presence of at least one molecular weight regulator.

10. The process as claimed in claim 1, wherein the homo- or copolymer P1 is a homo- or copolymer which is formed from 10 to 250 monomer units.

11. The process as claimed in claim 1, wherein the monoamine compound A is an amine of the formula (II):

$$R^2NH-R^3 \quad (II);$$

where $R^2$ and $R^3$ together form a ring which optionally comprises oxygen, sulfur or further nitrogen atoms;

or where $R^2$ and $R^3$ are each independently an alkyl group having from 1 to 12 carbon atoms, a cycloalkyl group having from 5 to 9 carbon atoms, an aralkyl group having from 7 to 12 carbon atoms, a hydroxyalkyl group, a compound of the formula (III), (IV) or (V), or H:

(III)

(IV)

(V)

where $R^4$ is an alkylene group and $R^5$ is a $C_1$- to $C_4$-alkyl group, and X is an S, O or N, and v=1 when X=S or O, or v=2 when X=N; and $R^6$ is an alkylene group optionally having heteroatoms;

x, y, z each independently have the values of 0-250 and x+y+z=3-250;

EO=ethyleneoxy, PO=propyleneoxy, BuO=butyleneoxy or isobutyleneoxy, with a sequence of the BO, PO, BuO units in any possible sequence;

and $R^1$=alkyl group having 1-20 carbon atoms or alkylaryl group having 7-20 carbon atoms.

12. The process as claimed in claim 11, wherein compound A is selected from the group consisting of ammonia, morpholine, 2-morpholin-4-ylethylamine, 2-morpholin-4-ylpropylamine, N,N-dimethylaminopropylamine, ethanolamine, diethanolamine, 2-(2-aminoethoxy)ethanol, dicyclohexylamine, benzylamine, 2-phenylethylamine and mixtures thereof.

13. The process as claimed in one claim 1, wherein a monoamine compound A' is used in the first step in addition to the monohydroxylic compound E.

14. The process as claimed in claim 13, wherein the monoamine compound A' is an amine of the formula (II'):

$$R^{2'}NH-R^{3'} \quad (II')$$

where $R^{2'}$ and $R^{3'}$ together form a ring which optionally comprises oxygen, sulfur or further nitrogen atoms;

or where $R^{2'}$ and $R^{3'}$ are each independently an alkyl group having from 8 to 20 carbon atoms, a cycloalkyl group having from 5 to 9 carbon atoms, an aralkyl group having from 7 to 12 carbon atoms, a compound of the formula (III'), (IV') or (V') or H:

(III')

(IV')

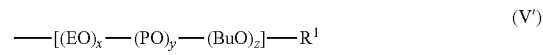
(V')

where $R^{4'}$ is an alkylene group and $R^{5'}$ is a $C_1$- to $C_4$-alkyl group, and X is an S, O or N, and v=1 when X=S or O, or v=2 when X=N; and $R^{6'}$ is an alkylene group optionally having heteroatoms, x, y, z each independently have the values of 0-250 and x+y+z=3-250;

EO=ethyleneoxy, PO=propyleneoxy, BuO=butyleneoxy or isobutyleneoxy, with a sequence of the EO, PO, BuO units in any possible sequence;

and $R^1$=alkyl group having 1-20 carbon atoms or alkylaryl group having 7-20 carbon atoms.

15. The process as claimed in claim 14, wherein in the monoamine compound A' of the formula (II'), the substituent $R^{2'}$ is of the formula (V') and $R^{3'}$ is H.

16. The process as claimed in claim 1, wherein the second step is effected in a solvent.

17. The process as claimed in claim 1, wherein the temperature of the first step is between 140° C. and 200° C., and the temperature of the second step is between 10° C. and 60° C.

18. The process as claimed in claim 1, wherein the polymer P having amide and ester groups has the formula (VI):

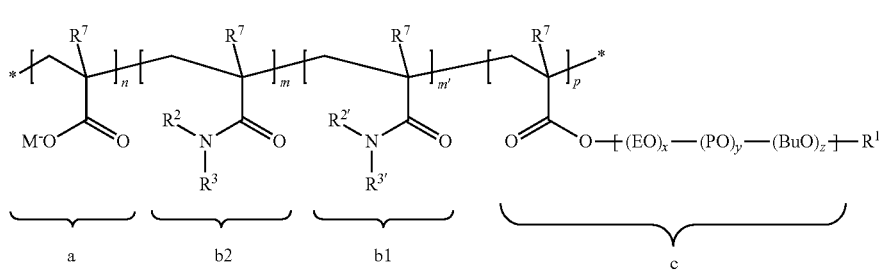

where M=cation;
$R^7$ are each independently an H or methyl; and
$R^2$ and $R^3$ together form a ring which optionally comprises oxygen, sulfur or further nitrogen atoms; or
$R^2$ and $R^3$ are each independently an alkyl group having from 1 to 12 carbon atoms, a cycloalkyl group having from 5 to 9 carbon atoms, an aralkyl group having from 7 to 12 carbon atoms, a hydroxyalkyl group, a compound of the formula (III), (IV) or (V), or H:

and
$R^{2'}$ and $R^{3'}$ together form a ring which optionally comprises oxygen, sulfur or further nitrogen atoms; or
$R^{2'}$ and $R^{3'}$ are each independently an alkyl group having from 8 to 20 carbon atoms, a cycloalkyl group having from 5 to 9 carbon atoms, an aralkyl group having from 7 to 12 carbon atoms, a compound of the formula (III'), (IV') or (V'), or H:

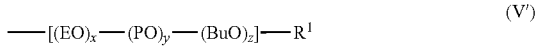

and
n+m+m'+p=10-250, and n>0, m>0, p>0 and m'≧0, and where
$R^4$ and $R^{4'}$ are each an alkylene group,
$R^5$ and $R^{5'}$ are each a $C_1$- to $C_4$-alkyl group,
$R^6$ and $R^{6'}$ are each an alkylene group optionally having heteroatoms,
X is an S, O or N,
v=1 when X=S or O, or v=2 when X=N,
x, y, z each independently have the values of 0-250 and x+y+z=3-250;

EO=ethyleneoxy, PO=propyleneoxy, BuO=butyleneoxy or isobutyleneoxy, with a sequence of the EO, PO, BuO units in any possible sequence; and
$R^1$=alkyl group having 1-20 carbon atoms or alkylaryl group having 7-20 carbon atoms.

19. The process according to claim 2, wherein the first step is effected in the presence of an acid selected from the group consisting of sulfuric acid, p-toluenesulfonic acid, benzenesulfonic acid, methanesulfonic acid, phosphoric acid or phosphorous acid.

20. The process according to claim 19, wherein the first step is effected in the presence of sulfuric acid.

21. The process according to claim 5, wherein the monohydroxylic compound E is a polyalkylene glycol which is capped at one end and has a molecular weight Mw of from 500 to 5000 g/mol.

22. The process according to claim 21, wherein the monohydroxylic compound E is a polyalkylene glycol which is capped at one end and has a molecular weight $M_w$ of from 800 to 3000 g/mol.

23. The process according to claim 8, wherein the homopolymer P1 is a polymethacrylic acid, the salts or partial salts thereof.

24. The process according to claim 9, wherein the homo- or copolymer P1 of (meth)acrylic acid is prepared by a radical polymerization in the presence of a sulfur compound or of a phosphorus compound.

25. The process according to claim 10, wherein the homo- or copolymer P1 is a homo- or copolymer which is formed from 20 to 100 monomer units.

26. The process according to claim 25, wherein the homo- or copolymer P1 is a homo- or copolymer which is formed from 25 to 80 monomer units.

27. The process according to claim 11, wherein $R^2$ and $R^3$ together form a ring which comprises oxygen, sulfur or further nitrogen atoms.

28. The process according to claim 11, wherein $R^2$ and $R^3$ are each independently an alkyl group having from 1 to 12 carbon atoms, a cycloalkyl group having from 5 to 9 carbon atoms, an aralkyl group having from 7 to 12 carbon atoms, a —$CH_2CH_2$—OH or —$CH_2CH(OH)CH_3$ group, a compound of the formula (III), (IV) or (V), or H.

29. The process according to claim 14, wherein $R^{2'}$ and $R^{3'}$ together form a ring which optionally comprises oxygen, sulfur or further nitrogen atoms.

30. The process according to claim 15, wherein the compound A' is an α-methoxy-ω-amino-oxyethylene-oxypropylene copolymer or an α-methoxy-ω-amino-polyoxyethylene.

31. The process according to claim 30, wherein the compound A' is an α-methoxy-ω-amino-polyoxyethylene.

32. The process according to claim 16, wherein the second step is effected in a solvent selected from the group consisting of hexane, toluene, xylene, methylcyclohexane, cyclohexane, dioxane, alcohols and water.

33. The process according to claim 32, wherein the second step is effected in water.

34. The process according to claim 17, wherein the temperature of the second step is between 15° C. and 40° C.

35. The process according to claim 18, wherein M is $H^+$, $Na^+$, $Ca^{++}/2$, $Mg^{++}/2$, $NH_4^+$ or an organic ammonium.

36. The process according to claim 18, wherein $R^2$ and $R^3$ together form a ring which comprises oxygen, sulfur or further nitrogen atoms.

37. The process according to claim 18, wherein $R^2$ and $R^3$ are each independently an alkyl group having from 1 to 12 carbon atoms, a cycloalkyl group having from 5 to 9 carbon atoms, an aralkyl group having from 7 to 12 carbon atoms, a —$CH_2CH_2$—OH or —$CH_2CH(OH)CH_3$ group, a compound of the formula (III), (IV) or (V), or H.

38. The process according to claim 18, wherein $R^{2'}$ and $R^{3'}$ together form a ring which comprises oxygen, sulfur or further nitrogen atoms.

39. The process according to claim 18, wherein n+m+m'+p=20-100.

\* \* \* \* \*